United States Patent
Higuchi et al.

(10) Patent No.: US 6,695,716 B2
(45) Date of Patent: *Feb. 24, 2004

(54) GOLF BALL

(75) Inventors: Hiroshi Higuchi, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/153,746

(22) Filed: May 24, 2002

(65) Prior Publication Data

US 2003/0013552 A1 Jan. 16, 2003

Related U.S. Application Data

(60) Provisional application No. 60/300,860, filed on Jun. 27, 2001.

(30) Foreign Application Priority Data

May 30, 2001 (JP) .............................. 2001-163003

(51) Int. Cl.$^7$ .......................... A63B 37/06; C08K 3/22; C08L 9/00
(52) U.S. Cl. ............... 473/357; 524/432; 524/526; 524/534
(58) Field of Search ................ 473/357, 356, 473/359, 373, 374, 371, 372; 524/432, 908, 526, 534, 193

(56) References Cited

U.S. PATENT DOCUMENTS

| | | |
|---|---|---|
| 4,683,257 A | 7/1987 | Kakiuchi et al. |
| 4,929,678 A | 5/1990 | Hamada et al. |
| 4,955,613 A | 9/1990 | Gendreau et al. |
| 5,082,285 A | 1/1992 | Hamada et al. |
| 6,194,505 B1 | 2/2001 | Sone et al. |
| 6,315,679 B1 * | 11/2001 | Sano .......................... 473/357 |
| 2002/0198063 A1 * | 12/2002 | Higuchi et al. ............. 473/371 |
| 2003/0013553 A1 * | 1/2003 | Higuchi et al. ............. 473/371 |
| 2003/0013554 A1 * | 1/2003 | Higuchi et al. ............. 473/371 |
| 2003/0013555 A1 * | 1/2003 | Higuchi et al. ............. 473/371 |
| 2003/0017888 A1 * | 1/2003 | Higuchi et al. ............. 473/371 |

FOREIGN PATENT DOCUMENTS

| | | |
|---|---|---|
| JP | 58-225138 A | 12/1983 |
| JP | 62-089750 A | 4/1987 |
| JP | 63-275356 | 11/1988 |
| JP | 02-268778 A | 11/1990 |
| JP | 03-151985 A | 6/1991 |
| JP | 07-268132 A | 10/1995 |
| JP | 11-070187 A | 3/1999 |
| JP | 0920886 A2 | 6/1999 |
| JP | 11-164912 A | 6/1999 |
| JP | 11-319148 A | 11/1999 |
| JP | 2000-42141 A | 2/2000 |

OTHER PUBLICATIONS

European Office Action.

* cited by examiner

*Primary Examiner*—Raleigh W. Chu
*Assistant Examiner*—Tom Duong
(74) *Attorney, Agent, or Firm*—Sughrue Mion, PLLC

(57) ABSTRACT

A golf ball including, as a composing element, a hot-molded product obtained from a rubber composition. The rubber composition includes: a polybutadiene obtained by mixing a polybutadiene (a) with a polybutadiene (b) at a mass ratio [(a)/(b)] ranging from 70/30 to 10/90, an unsaturated carboxylic acid and/or a metal salt thereof, and an organic peroxide. The polybutadiene (a) contains 60% or more of cis-1,4-bonds and has a Mooney viscosity [$ML_{1+4}(100°\ C.)$] of 10 or more and less than 50, and is synthesized by using a group VIII element catalyst, and the polybutadiene (b) contains 60% or more of cis-1,4-bonds and has a Mooney viscosity [$ML_{1+4}(100°\ C.)$] of 50 or more, and is synthesized by using a rare earth element based catalyst.

2 Claims, No Drawings

GOLF BALL

CROSS REFERENCE TO RELATED APPLICATION

This application is an application filed under 35 U.S.C. §111(a) claiming benefit pursuant to 35 U.S.C §119(e)(i) of the filing date of the Provisional Application No. 60/300,860 filed on Jun. 27, 2001 pursuant to 35 U.S.C. §111(b).

BACKGROUND OF THE INVENTION

1. Field of the Invention

The present invention relates to a golf ball excellent in resilience, which ball is producible with high workability.

2. Prior Art

Conventionally, to give excellent resilience to a golf ball, various attempts have been made to improve the composition of a polybutadiene used as a main rubber for the golf ball.

For example, Japanese Patent Laid-open No. Sho 62-89750 has proposed a rubber composition for a solid golf ball, which contains, as a main rubber, a polybutadiene having a Mooney viscosity ranging from 70 to 100 and synthesized by using an Ni or Co catalyst and a polybutadiene having a Mooney viscosity ranging from 30 to 90 and synthesized by using a lantern based catalyst or a polybutadiene having a Mooney viscosity ranging from 20 to 50 and synthesized by using an Ni or Co catalyst.

The above-described golf ball, however, has been further required to be improved in terms of workability at the time of extrusion of the rubber composition and resilience of the ball.

Japanese Patent Laid-open No. Hei 2-268778 has proposed a golf ball, which is produced from a rubber composition containing a polybutadiene having a Mooney viscosity of less than 50 and synthesized by using a group VIII element catalyst and a polybutadiene having a Mooney viscosity of less than 50 and synthesized by using a lanthanide catalyst. The golf ball thus obtained, however, is poor in resilience.

Japanese Patent Laid-open No. Hei 11-70187 has proposed a multi-piece solid golf ball including an intermediate layer made from a polybutadiene having a low Mooney viscosity; Japanese Patent Laid-open No. Hei 11-319148 has proposed a solid golf ball produced from a rubber composition containing a polybutadiene having a Mooney viscosity ranging from 50 to 60 and synthesized by using an Ni or Co catalyst and a polybutadiene having a Mooney viscosity ranging from 20 to 90 and synthesized by using lanthanoid based catalyst; Japanese Patent Laid-open No. Hei 11-164912 has proposed a solid golf ball produced from a rubber composition in which the amount of 1,2-vinyl bonds is in a range of 2.0% or less and a ratio (Mw/Mn) of a weight-average molecular weight to a number-average molecular weight is in a range of 3.5 or less; Japanese Patent Laid-open No. Sho 63-275356 has proposed a golf ball produced from a rubber composition containing a polybutadiene having a high Mooney viscosity; and Japanese Patent Laid-open No. Hei 3-151985 has proposed a golf ball produced from a rubber composition containing a polybutadiene having a high number-average molecular weight and a polybutadiene having a low number-average molecular weight. Each of these golf balls, however, is disadvantageous in that it is poor in workability at the time of extrusion of the rubber composition and/or low in resilience of the ball.

SUMMARY OF THE INVENTION

In view of the foregoing, the present inventor has earnestly examined and found that a golf ball including, as a composing element, a hot-molded product obtained from a rubber composition, the rubber composition including a polybutadiene obtained by mixing a polybutadiene (a) with a polybutadiene (b) at a mass ratio [(a)/(b)] ranging from 70/30 to 10/90; an unsaturated carboxylic acid and/or a metal salt thereof; and an organic peroxide; wherein said polybutadiene (a) contains 60% or more of cis-1,4-bonds and has a Mooney viscosity [$ML_{1+4}(100°\ C.)$] of 10 or more and less than 50, and is synthesized by using a group VIII element catalyst, and said polybutadiene (b) contains 60% or more of cis-1,4-bonds and has a Mooney viscosity [$ML_{1+4}(100°\ C.)$] of 50 or more, and is synthesized by using a rare earth element based catalyst, is advantageous due to a synergism effect of a polybutadiene obtained by mixing two kinds of polybutadienes at a specific ratio and the essential components. In general, a material having a high Mooney viscosity and thereby having a high resilience is poor in moldability, that is, workability in extrusion of a rubber which has been kneaded, whereas a material having a low Mooney viscosity is good in moldability in extrusion of a rubber which has been kneaded but is poor in resilience of the ball. The above-described rubber composition examined by the present inventor can solve such an inconsistent problem. That is to say, the present inventor has found that the above-described rubber composition is good in moldability in extrusion after kneading and also good in resilience of the ball, and thereby a molded product excellent in resilience can be obtained from the rubber composition with good workability, and that a golf ball having excellent resilience can be produced by using the molded product thus obtained as a composing element of the ball.

Accordingly, the present invention provides the following golf balls:

(1) A golf ball including, as a composing element, a hot-molded product obtained from a rubber composition, said rubber composition including:
  a polybutadiene obtained by mixing a polybutadiene (a) with a polybutadiene (b) at a mass ratio [(a)/(b)] ranging from 70/30 to 10/90;
  an unsaturated carboxylic acid and/or a metal salt thereof; and
  an organic peroxide;
  wherein said polybutadiene (a) contains 60% or more of cis-1,4-bonds and has a Mooney viscosity [$ML_{1+4}(100°\ C.)$] of 10 or more and less than 50, and is synthesized by using a group VIII element catalyst, and said polybutadiene (b) contains 60% or more of cis-1,4-bonds and has a Mooney viscosity [$ML_{1+4}(100°\ C.)$] of 50 or more, and is, synthesized by using a rare earth element based catalyst.

(2) A golf ball according to claim 1, wherein said golf ball is either a one-piece golf ball or a golf ball including a solid core or a solid center, and a flexural amount of said one-piece solid golf ball, solid core, or solid center, measured by applying a load of 980 N (100 kg) thereto, is in a range of 2.0 to 6.0 mm.

(3) A golf ball according to claim 1 or 2, wherein letting a weight-average molecular weight be Mw ($\times 10^4$), a number-average molecular weight be Mn ($\times 10^4$), and a ratio of the weight-average molecular weight to the number-average molecular weight be Mw/Mn, the ratio Mw/Mn of said component (a) is in a range of 3.0 to 6.0, and the Mw/Mn of said component (b) is in a range of 2.0 to 4.0.

DETAILED DESCRIPTION OF THE INVENTION

Hereinafter, the present invention will be described in detail. A golf ball of the present invention includes a hot-molded product obtained from a rubber composition. The rubber composition contains, as a main rubber, a polybutadiene component obtained by mixing a polybutadiene (a) with a polybutadiene (b). The polybutadiene (a) contains 60% or more of cis-1,4-bonds and has a Mooney viscosity [$ML_{1+4}(100°\ C.)$] of 10 or more and less than 50, and is synthesized by using a group VIII element catalyst. The polybutadiene (b) contains 60% or more of cis-1,4-bonds and has a Mooney viscosity [$ML_{1+4}(100°\ C.)$] of 50 or more, and is synthesized by using a rare earth element based catalyst.

The polybutadiene component (a) is added to improve the workability, and is required to contain the cis-1,4-bonds in an amount of 60% or more, preferably, 80% or more, more preferably, 90% or more, most preferably, 95% or more. If the amount of the cis-1,4-bonds is excessively small, the resilience is reduced.

The Mooney viscosity [$ML_{1+4}(100°\ C.)$] of the polybutadiene component (a) is required to be in a range of 10 or more, preferably, 20 or more, more preferably, 25 or more, most preferably, 30 or more, with the upper limit being in a range of less than 50, preferably, 48 or less, more preferably, 46 or less, most preferably, 44 or less.

The Mooney viscosity used herein is an industrial index of viscosity measured by a Mooney viscometer which is one kind of a rotary plastimeter under JIS-K6300. The Mooney viscosity is expressed in $ML_{1+4}(100°\ C.)$, where M indicates the Mooney viscosity, L indicates a large rotor (L-type) of the plastimeter, "(1+4)" indicates that a pre-heating time is one minute and a rotational time of the rotor is four minutes, and "100° C." indicates a measurement temperature.

The polybutadiene component (a) is required to be synthesized by using a group VIII element catalyst, for example, a nickel based catalyst or a cobalt based catalyst.

Examples of the nickel based catalysts may include a one-component type such as nickel diatomaceous earth; a two-component type such as Raney-nickel/titanium tetrachloride; and a three-component type such as a nickel compound/organic metal/boron trifluoride etherate. Examples of nickel compounds may include reduced nickel with carrier, Raney-nickel, nickel oxide, nickel carboxylate, and a complex salt of organic nickel. Examples of the organic metals may include a trialkyl aluminum such as triethyl aluminum, tri-n-propyl aluminum, tri-isobutyl aluminum, or tri-n-hexyl aluminum; an alkyl lithium such as n-butyl lithium, sec-butyl lithium, tert-butyl lithium, or 1,4-dibutane lithium; and a dialkyl zinc such as diethyl zinc or dibutyl zinc.

Examples of the cobalt based catalysts may include, as cobalt and compounds thereof, Raney-cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyl dithiocarbamate, cobalt anilinium nitrite, and cobalt dinitrosyl chloride. In particular, each of these compounds is preferably combined with a dialkyl aluminum monochloride such as diethyl aluminum monochloride or diisobutyl aluminum monochloride, a trialkyl aluminum such as triethyl aluminum, tri-n-propyl aluminum, triisobutyl aluminum or tri-n-hexyl aluminum, an aluminum alkyl sesquichloride such as ethyl aluminum sesquichloride, or aluminum chloride.

The polymerization of butadiene monomers by using the above group VIII element based catalyst, particularly, a nickel or cobalt based catalyst can be generally performed by continuously charging the butadiene monomers and the catalyst, together with a solvent, in a reaction chamber, and subjecting them to reaction by suitably selecting a reaction temperature in a range of 5 to 60° C. and a reaction pressure in a range of atmospheric pressure to 70 and several atm so as to obtain the above-described Mooney viscosity.

According to the present invention, with respect to the polybutadiene component (a), letting a weight-average molecular weight be Mw ($\times 10^4$), a number-average molecular weight be Mn ($\times 10^4$), a ratio (Mw/Mn) of the weight-average molecular weight to the number-average molecular weight may be in a range of 3.0 or more, preferably, 3.3 or more, more preferably, 3.6 or more, most preferably, 3.9 or more, with the upper limit being in a range of 6.0 or less, preferably, 5.5 or less, more preferably, 5.0 or less, most preferably, 4.5 or less. If the ratio Mw/Mn is excessively small, the workability is degraded, and if excessively large, the resilience is reduced.

To enhance the resilience, the polybutadiene component (b) is required to contain cis-1,4-bonds in an amount of 60% or more, preferably, 80% or more, more preferably, 90% or more, most preferably, 95% or more. If the amount of the cis-1,4-bonds is excessively small, the resilience is reduced.

The Mooney viscosity [$ML_{1+4}(100°\ C.)$] of the polybutadiene component (b) is required to be in a range of 50 or more, preferably, 52 or more, more preferably, 55 or more, still more preferably, 60 or more, most preferably, 65 or more, with the upper limit being in a range of less than 140, preferably, 120 or less, more preferably, 100 or less.

The polybutadiene component (b) of the present invention is required to be synthesized by using a rare earth element based catalyst.

As the rare earth element based catalyst, there can be used a known type such as lantern series rare earth element compound, an organic aluminum compound, alumoxane, a halogen containing compound, or a combination thereof with a Lewis base.

Examples of the lantern series rare earth element compounds may include a halide, a carboxylate, an alcoholate, a thioalcoholate, and an amide of a metal having an atomic number of 57 to 71.

As the organic aluminum compound, there can be used a compound expressed, for example, by $AlR^1R^2R^3$ ($R^1$, $R^2$ and $R^3$ may be identical to each other or different from each other, and each of $R^1$, $R^2$ and $R^3$ is a residual hydrocarbon group having the hydrogen or carbon number of 1 to 8).

As the alumoxane, there is preferably used a compound having a structure expressed by the following chemical formula (1) or (2):

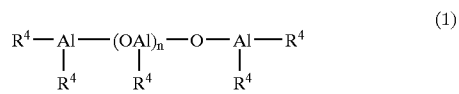

(1)

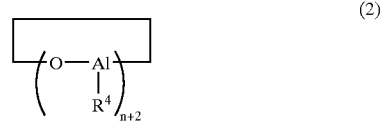

(2)

In each chemical formula, $R^4$ is a hydrocarbon group containing carbon atoms of the carbon number of 1 to 20, and n is an integer of 2 or more.

In addition, an associated body of the alumoxane indicated by "Fine Chemical, 23, (9), 5 (1994)", "J. Am. Chem. Soc., 115, 4971 (1993)", or "J. Am, Chem. Soc., 117, 6465 (1995)" may be used.

As the halogen containing compound, there can be used an aluminum halide expressed by $AlX_nR_{3-n}$ (X is a halogen, R is a residual hydrocarbon group having the carbon number of 1 to 20, for example, an alkyl group, aryl base, or aralkyl base, and n is 1, 1.5, 2 or 3), a strontium halide such as $Me_3SrCl$, $Me_2SrCl_2$, $MeSrHCl_2$, $MeSrCl_3$, or a metal halide such as silicon tetrachloride, tin tetrachloride, or titanium tetrachloride.

The Lewis base can be used for complexing the lantern series rare earth element compound. For example, acethyl acetone or ketone alcohol can be used as the Lewis base.

According to present invention, particularly, the use of a neodymium base catalyst using a neodymium compound as the lantern series rare earth element compound advantageously allows production of a polybutadiene containing a large amount of the cis-1,4-bonds and a small amount of the 1,2-vinyl bonds with an excellent polymerization activity. The concrete example of the rare earth element based catalyst has been described in Japanese Patent Laid-open No. Hei 11-35633.

In the case of polymerization of butadiene monomers under a rare earth element catalyst, a solvent may be used, or any solvent may be not used. In the latter case, butadiene monomers may be subjected to bulk polymerization or a vapor-phase polymerization. The polymerization temperature may be in a range of 30 to 150° C., preferably, 10 to 100° C.

The polybutadiene component (b) of the present invention may be obtained by polymerization using the rare earth based catalyst, followed by reaction of active terminals of the polymer with a terminal denaturant.

As the terminal denaturants, there can be used the following known compounds (1) to (6):

(1) A halogenated organic metal compound, a halogenated metal compound, or an organic metal compound expressed by $R^5{}_nM'X_{4-n}$, $M'X_4$, $M'X_3$, $R^5{}_nM'(—R^6—COOR^7)_{4-n}$, or $R^5{}_nM'(—R^6—COR^7)_{4-n}$ (in the chemical formula, $R^5$ and $R^6$ may be identical to each other or different from each other, and each of $R^5$ and $R^6$ is a hydrocarbon group containing carbon atoms of the carbon number of 1 to 20; $R^7$ is a hydrocarbon group containing carbon atoms of the carbon number of 1 to 20, which may contain a carbonyl group or ester group at a side chain; M' is a tin atom, silicon atom, germanium atom, or phosphorus atom; X is a halogen atom; and n is 0 or an integer selected from 1 to 3).

(2) A heterocumulene compound containing, in molecules, Y=C=Z bonds (in the formula, Y is a carbon atom, oxygen atom, nitrogen atom, or sulfur atom; Z is an oxygen atom, nitrogen atom, or sulfur atom).

(3) A hetero-tricyclic compound containing, in molecules, bonds expressed by the following chemical formula:

In the chemical formula, Y is an oxygen atom, nitrogen atom, or sulfur atom.

(4) A halogenated isocyano compound.

(5) $R^8—(COOH)_m$, $R^9(COX)_m$, $R^{10}—(COO—R^{11})$, $R^{12}—OCOO—R^{13}$, $R^{14}—(COOCO—R^{15})_m$, or a carboxylic acid, an acid halide, an ester compound, a carbonic ester compound, or an acid anhydride, which is expressed by the following chemical formula:

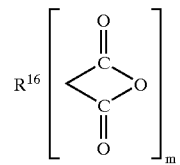

In the formula, $R^8$ to $R^{16}$ may be identical to each other or different from each other, and each of $R^8$ to $R^{16}$ is a hydrocarbon group containing carbon atoms of the carbon number of 1 to 50, X is a halogen atom, and m is an integer selected from 1 to 5.

(6) $R^{17}{}_l$, $M''$ $(OCOR^{18})_{4-l}$, $R^{19}{}_lM''(OCO—R^{20}—COOR^{21})_{4-l}$, or a metal salt of a carboxylic acid expressed by the following chemical formula:

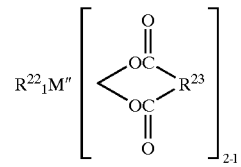

In the chemical formula, $R^{17}$ to $R^{23}$ may be identical to each other or different from each other, and each of $R^{17}$ to $R^{23}$ is a hydrocarbon group containing carbon atoms of the carbon number of 1 to 20, M" is a tin atom, silicon atom, or germanium atom, l is 0 or an integer selected from 1 to 3.

A concrete example of the terminal denaturant shown in each of the above items (1) to (6) and a method of allowing the terminal denaturant to react with active terminals of a polymer have been disclosed, for example, in Japanese Patent Laid-open Nos. Hei 11-35633 and Hei 7-268132.

According to the present invention, with respect to the polybutadiene component (b), letting a weight-average molecular weight be Mw ($\times 10^4$), a number-average molecular weight be Mn ($\times 10^4$), a ratio (Mw/Mn) of the weight-average molecular weight to the number-average molecular weight may be in a range of 2.0 or more, preferably, 2.2 or more, more preferably, 2.4 or more, most preferably, 2.6 or more, with the upper limit being in a range of 4.0 or less, preferably, 3.8 or less, more preferably, 3.6 or less, most preferably, 3.4 or less. If the ratio Mw/Mn is excessively small, the workability is degraded, and if excessively large, the resilience may be reduced.

According to the present invention, it is required to use a main rubber obtained by mixing a specific amount of the polybutadiene component (a) with a specific amount of the polybutadiene component (b). The added amount of the polybutadiene component (a) may be in a range of 10 parts by mass or more, preferably, 20 parts by mass or more, more preferably, 30 parts by mass or more, with the upper limit being in a range of 70 parts by mass or less, preferably, 60 parts by mass or less, more preferably, 55 parts by mass or less, most preferably, 50 parts by mass or less. The added amount of the polybutadiene component (b) may be in a range of 90 parts by mass or less, preferably, 80 parts by mass or less, more preferably, 70 parts by mass or less, with the lower limit being in a range of 30 parts by mass or more, preferably, 40 parts by mass or more, more preferably, 45 parts by mass or more, most preferably, 50 parts by mass or more. If the added amount of each component is out of the above range, the workability in extrusion of the rubber composition is degraded and the resilience of the molded product is reduced, and therefore, the function and effect intended by the present invention cannot be attained.

If needed, another diene based rubber, such as styrene-butadiene rubber (SBR), natural rubber, isoprene rubber, or ethylene-propylene-diene rubber (EPDM) may be suitably mixed in the above main rubber.

The rubber composition of the present invention contains, in addition to the main rubber obtained by mixing the polybutadiene component (a) with the polybutadiene component (b), an unsaturated carboxylic acid and/or a metal salt thereof and an organic peroxide as essential components. Such a rubber composition exhibits an excellent moldability in extrusion of the rubber composition, and a hot-molded product thus obtained from the rubber composition is excellent in resilience, with a result that a golf ball including the hot-molded product becomes excellent in resilience.

Examples of the unsaturated carboxylic acids may include acrylic acid, metacrylic acid, maleic acid, fumaric acid. In particular, acrylic acid and metacrylic acid are preferably used.

Examples of the metal salts of unsaturated carboxylic acids may include zinc salts and magnesium salts of unsaturated aliphatic acids, for example, zinc metacrylate and zinc acrylate. In particular, zinc acrylate is preferably used.

The content of the unsaturated carboxylic acid and/or metal salt thereof may be set, on the basis of 100 parts by mass of the main rubber, in a range of 10 parts by mass or more, preferably, 15 parts by mass or more, more preferably, 20 parts by mass or more, with the upper limit being in a range of 60 parts by mass or less, preferably, 50 parts by mass or less, more preferably, 45 parts by mass or less, most preferably, 40 parts by mass or less. If the content is excessively small, the resilience is reduced, and if excessively large, the golf ball becomes excessively hard, which may make player's feeling of hitting of the golf ball undesirable.

As the organic peroxide, there can be used a commercial product such as "Percumyl D" (sold by NOF CORPORATION), "Perhexa 3M" (sold by NOF CORPORATION), "Luperco 231XL" (sold by Elf Atochem Japan). Two kinds or more organic peroxides may be used in combination as needed.

The content of the organic peroxide may be set, on the basis of 100 parts by mass of the main rubber, in a range of 0.1 part by mass or more, preferably, 0.3 part by mass or more, more preferably, 0.5 part by mass or more, most preferably, 0.7 part by mass or more, with the upper limit being in a range of 5 parts by mass or less, preferably, 4 parts by mass or less, more preferably, 3 parts by mass or less, most preferably, 2 parts by mass or less. If the content is excessively large or small, the resilience, player's feeling of hitting the golf ball, and durability may be degraded.

In addition to the above-described essential components, an inorganic filler can be added to the rubber composition of the present invention for adjusting the specific gravity, as needed. Examples of the inorganic fillers may include zinc oxide, barium sulfate, and calcium carbonate. In order to obtain a suitable weight and desirable resilience, the content of the inorganic filler may be set, on the basis of 100 parts by mass of the main rubber, in a range of 1 part by mass or more, preferably, 3 parts by mass or more, more preferably, 5 parts by mass or more, most preferably, 7 parts by mass or more, with the upper limit being in a range of 130 parts by mass or less, preferably, 50 parts by mass or less, more preferably, 45 parts by mass or less, most preferably, 40 parts by mass or less.

An antioxidant may be further added to the rubber composition of the present invention, as needed. As the antioxidant, there can be used a commercial product such as "NOCRAC NS-6, NS-30" (sold by Ouchi-Sinko Chemical Industrial Co., Ltd.), or "Yoshinox 425" (Yoshitomi Pharmaceutical Co., Ltd.). In order to obtain desirable resilience and durability, the content of the antioxidant may be set, on the basis of 100 parts by mass of the main rubber, in a range of 0 part by mass or more, preferably, 0.05 part by mass or more, more preferably, 0.1 part by mass or more, most preferably, 0.2 part by mass or more, with the upper limit being in a range of 3 parts by mass or less, preferably, 2 parts by mass or less, more preferably, 1 part by mass or less, most preferably, 0.5 part by mass or less.

The rubber composition of the present invention can further contain an organic sulfur compound. Examples of the organic sulfur compounds may include thiophenol, thionaphthol, halogenated thiophenol, or metal salts thereof, more concretely, zinc salts of pentachlorothiophenol, pentafluorothiophenol, pentabromothiophenol, and parachlorothiophenol; and diphenyl polysulfide, dibenzil polysulfide, dibenzoil polysulfide, dibenzothiazoil polysulfide, and dithiobenzoil polysulfide, each of which has the sulfur number of 2 to 4. In particular, a zinc salt of pentachlorothiophenol or diphenyl disulfide is preferably used. The content of the organic sulfur compound may be set, on the basis of 100 parts by mass of the main rubber, in a range of 0.1 part by mass or more, preferably, 0.2 part by mass or more, more preferably, 0.5 part by mass or more, with the upper limit being in a range of 5 parts by mass or less, preferably, 4 parts by mass or less, more preferably, 3 parts by mass or less, most preferably, 2 parts by mass or less.

The hot-molded product of the present invention can be obtained by vulcanizing and heating the above-described rubber composition by a known process. For example, a vulcanizing temperature may be set in a range of 100 to 200° C., and a vulcanizing time be set in a range of 10 to 40 min.

According to the present invention, the hardness of the hot-molded product can be suitably adjusted in accordance with the usage form (to be described later) of a golf ball, and is not particularly limited. For example, the sectional hardness of the hot-molded product may be uniform from the center to the surface of the molded-product, or a difference in sectional hardness may be present between the center and the surface of the molded-product.

The golf ball of the present invention can be used in any one of various forms to be described later. In particular, in the case where the golf ball of the present invention is a one-piece golf ball or a golf ball including a solid core or solid center, a flexural amount of the one-piece solid golf ball, solid core, or solid center, measured by applying a load of 980 N (100 kg) thereto, may be in a range of 2.0 mm or more, preferably, 2.5 mm or more, more preferably, 2.8 mm or more, most preferably, 3.2 mm or more, with the upper limit being in a range of 6.0 mm or less, preferably, 5.5 mm or less, more preferably, 5.0 mm or less, most preferably, 4.5 mm or less. If the flexural amount, that is, the deformed amount is excessively small, player's feeling of hitting the golf ball becomes worse, and particularly, the spin of the ball becomes excessively high at the time of long-shot with a driver when the ball is liable to be largely deformed, to reduce the carry of the ball, and if the deformed amount is excessively large, that is, if the golf ball becomes excessively soft, player's feeling of hitting the ball becomes dull, the carry of the ball is reduced because of insufficient resilience, and durability against cracking due to repeated hitting may become worse.

The golf ball of the present invention is characterized by including the above hot-molded product as a composing element, and the form of the ball is not particularly limited. To be more specific, the golf ball of the present invention may be any of a one-piece golf ball in which the hot-molded product is directly applied to the golf ball, a two-piece solid golf ball in which the hot-molded product is used as a solid core on the surface of which a cover is formed, a multi-piece solid golf ball having three-pieces or more in which the hot-molded product is used as a solid core on the surface of which two or more cover layers are formed, and a bobbin type golf ball in which the hot-molded product is used as a center core. In particular, from the viewpoint of making effective use of the hot-molded product to improve the moldability in extrusion of the rubber composition and give excellent resilience to the ball, the golf ball of the present invention is preferably used in the form of a two-piece solid golf ball or a multi-piece solid golf ball.

According to the present invention, in the case of using the hot-molded product as a solid core, the diameter of the solid core may be in a range of 30.0 mm or more, preferably, 32.0 mm or more, more preferably, 35.0 mm or more, most preferably, 37.0 mm or more, with the upper limit being in a range of 41.0 mm or less, preferably, 40.5 mm or less, more preferably, 40.0 mm or less, most preferably, 39.5 mm or less. In particular, the diameter of the solid core used for a two-piece solid golf ball may be in a range of 37.0 mm or more, preferably, 37.5 mm or more, more preferably, 38.0 mm or more, most preferably, 38.5 mm or more, with the upper limit being in a range of 41.0 mm or less, preferably, 40.5 mm or less, more preferably, 40.0 mm or less; and the diameter of the solid core used for a three-piece solid golf ball may be in a range of 30.0 mm or less, preferably, 32.0 mm or less, more preferably, 34.0 mm or more, most preferably, 35.0 mm or more, with the upper limit being in a range of 40.0 mm or less, preferably, 39.5 mm or less, more preferably, 39.0 mm or less.

The specific gravity of the solid core may be in a range of 0.9 or more, preferably, 1.0 or more, more preferably, 1.1 or more, with the upper limit being in a range of 1.4 or less, preferably, 1.3 or less, more preferably, 1.2 or less.

In the case where the golf ball of the present invention is applied to a two-piece solid golf ball or a multi-piece solid golf ball, the golf ball can be produced by putting a solid core formed of the hot-molded product, and injecting-molding or press-molding a known cover material, or a known cover material and a known intermediate layer material on the solid core.

As a main material of each of the cover material and intermediate layer material, there may be used a thermoplastic or thermosetting polyurethane based elastomer, a polyester based elastomer, an ionomer resin, a polyolefine based elastomer, or a mixture thereof. These materials may be used singly or in combination of two kinds or more. In particular, the thermoplastic polyurethane elastomer or ionomer resin is preferably used.

As the thermoplastic polyurethane based elastomer, there can be used a commercial product such as an elastomer containing aliphatic or aromatic diisocyanate, for example, "Pandex T7298, T7295, T7890, TR3080, T8295, or T8290" (sold by DIC-Bayer Polymer Co., Ltd.). As the ionomer resin, there can be used a commercial product such as "Surlyn 6320, or 8120" (sold by Du Pont DE NEMOURS & COMPANY, USA), or "Himilan 1706, 1605, 1855, 1601, or 1557" (sold by Du Pont-Mitsui Polychemicals Co., Ltd.).

Another polymer such as a thermoplastic elastomer other than that described above may be added, as an arbitrary component, to the main material of each of the cover material and intermediate layer material. Examples of such polymers may include a polyamide based elastomer, a styrene based block elastomer, a hydrogenated polybutadiene, and an ethylene-vinyl acetate (EVA) copolymer.

The golf ball of the present invention, which is generally applied to a two-piece solid golf ball or a multi-piece solid golf ball, can be produced in accordance with a known process. While not particularly limited, the two-piece solid golf ball can be produced by putting a solid core formed of the hot-molded product in a specific injection-molding mold, and injecting the above cover material thereon by a specific known manner, and the multi-piece solid golf ball can be produced by putting a solid core formed of the hot-molded product in a specific injection-molding mold and sequentially injecting the above intermediate layer and cover material thereon by a specific manner. Alternatively, the cover material is formed on the solid core by press-molding.

The thickness of the intermediate layer used for a multi-piece solid golf ball may be in a range of 0.5 mm or more, preferably, 1.0 mm or more, with the upper limit being in a range of 3.0 mm or less, preferably, 2.5 mm or less, more preferably, 2.0 mm or less, most preferably. 1.6 mm or less.

The thickness of the cover used for a two-piece solid golf ball or multi-piece solid golf ball may be in a range of 0.7 mm or more, preferably, 1.0 mm or more, with the upper limit being in a range of 3.0 mm or less, preferably, 2.5 mm or less, more preferably, 2.0 mm or less, most preferably, 1.6 mm or less.

The golf ball of the present invention can be produced with its diameter and weight specified under a golf rule for golf games. Concretely, the diameter of the golf ball can be set in a range of 42.67 mm or more, with the upper limit being in a range of 44.0 mm or less, preferably, 43.5 mm or less, more preferably, 43.0 mm or less, and the weight of the golf ball can be set in a range of 45.93 g or less, with the lower limit being in a range of 44.5 g or more, preferably, 45.0 g or more, more preferably, 45.1 g or more, most preferably, 45.2 g or more.

EXAMPLE

The present invention will be more clearly understood by way of, while not limited thereto, the following examples and comparative examples.

Examples 1 to 7 and Comparative Examples 1 to 7

A rubber composition for a solid core was prepared by adding core materials shown in Table 2 to 100 parts by mass of each of polybutadiene components obtained by mixing polybutadienes of the following kinds (1) to (8) having physical properties shown in Table 1 at each mixing ratio shown in Table 2, and a solid core was produced from the rubber composition. In Table 2, "Percumyl D" (sold by NOF CORPORATION) was used as dicumyl peroxide, and NOCRAK NS-6 (sold by Ouchi-Sinko Chemical Industrial Co., Ltd.) was used as an antioxidant.

Kinds of Polybutadienes
(1) polybutadiene: "BR01" (sold by JSR Co., Ltd.)
(2) polybutadiene: "BR10" (sold by JSR Co., Ltd.)
(3) polybutadiene: "BR11" (sold by JSR Co., Ltd.)
(4) polybutadiene: "BR18" (sold by JSR Co., Ltd.)
(5) polybutadiene: "HCBN-11 (trial grade)" (sold by JSR Co., Ltd.)
(6) polybutadiene: "HCBN-12 (trial grade)" (sold by JSR Co., Ltd.)
(7) polybutadiene: "#9100081 (trial grade)" (sold by Firestone Co., Ltd.)
(8) polybutadiene: "UBE101" (sold by Ube Industries, Ltd.)

TABLE 1

| Kind | Catalyst | Cis-1,4-Structure (%) | Mooney Viscosity | Mw/Mn |
|---|---|---|---|---|
| Polybutadiene | | | | |
| (1) | Ni | 96 | 44 | 4.2 |
| (2) | Ni | 96 | 27.5 | 4.4 |
| (3) | Ni | 96 | 44 | 4.4 |
| (4) | Ni | 96 | 60 | 4.2 |
| (5) | Nd | 96 | 56 | 3.1 |
| (6) | Nd | 95 | 53 | 2.2 |
| (7) | Nd | 95 | 56 | 2.6 |
| (8) | Co | 95 | 38 | 4.2 |

TABLE 2

| Kind | Examples | | | | | | | Comparative Examples | | | | | | |
|---|---|---|---|---|---|---|---|---|---|---|---|---|---|---|
| | 1 | 2 | 3 | 4 | 5 | 6 | 7 | 1 | 2 | 3 | 4 | 5 | 6 | 7 |
| Polybutadiene Composition (mass %) | | | | | | | | | | | | | | |
| (1) | | | | | | | | | | | 50 | 50 | | 50 |
| (2) | | | | 25 | | | | | | | | | | |
| (3) | 50 | 50 | 50 | | 60 | | 50 | | | | 50 | | | 50 |
| (4) | | | | | | | | | | 50 | | | 50 | |
| (5) | | 50 | | | | | | | | | | | | |
| (6) | | | 50 | | | 50 | | | 100 | | | | | |
| (7) | 50 | | | 75 | 40 | | 50 | 100 | | 50 | | | | |
| (8) | | | | | | | 50 | | | | | 50 | 50 | |
| Core Composition (parts by mass) | | | | | | | | | | | | | | |
| Polybutadiene | 100 | 100 | 100 | 100 | 100 | 100 | 100 | 100 | 100 | 100 | 100 | 100 | 100 | 100 |
| Dicumyl Peroxide | 1.4 | 1.4 | 1.4 | 1.4 | 1.4 | 1.4 | 1.4 | 1.4 | 1.4 | 1.4 | 1.4 | 1.4 | 1.4 | 1.4 |
| Zinc Oxide | 23 | 23 | 23 | 23 | 23 | 23 | 35 | 23 | 23 | 23 | 23 | 23 | 23 | 35 |
| Antioxidant | 0.1 | 0.1 | 0.1 | 0.1 | 0.1 | 0.1 | 0.1 | 0.1 | 0.1 | 0.1 | 0.1 | 0.1 | 0.1 | 0.1 |
| Zinc Acrylate | 22 | 22 | 22 | 22 | 22 | 22 | 22 | 22 | 22 | 22 | 22 | 22 | 22 | 22 |

The rubber composition for a solid core was then suitably kneaded by a kneader or a roll, and the workability at the time of extruding a specific amount of the rubber composition was evaluated under the following criteria. The results are shown in Table 3.

Evaluation of Workability in Extrusion

The surface and shape of a slug obtained by extruding the rubber composition were evaluated under the following criteria:

Grade 5: the workability in extrusion is very good and the slug surface is good.

Grade 4: the workability in extrusion is good and the slug surface is slightly rough.

Grade 3: the rubber composition is extrudable but scuffing occurs on the slug surface.

Grade 2: the rubber composition is extrudable but scuffing on the slug surface is very conspicuous.

Grade 1: A failure in shape of the slug occurs, and it is difficult to extrude a specific amount of the rubber composition.

In each of Examples 1 to 6 and Comparative Example 1 to 6, a solid core having a diameter of about 38.9 mm and a weight of about 36.0 g was produced by using the above rubber composition for a solid core, and in each of Example 7 and Comparative Example 7, a solid core having a diameter of 35.3 mm and a weight of 31.0 g was produced by using the above rubber composition.

The press-molding of the rubber composition was performed at 150° C. for 20 min.

A deformed amount of the solid core thus obtained, measured by applying a load of 980 N (100 kg) thereto, was examined, and further the resilience of the solid core was examined as follows. The results are shown in Table 3.

Flexural Amount (Load: 980 N)

A deformed amount (mm) of the solid core, measured by applying a load of 980 N (100 kg), was measured.

Resilience

The initial velocity of a golf ball obtained by using the above solid core was measured by an initial velocity meter of the same type as that used in a certified institution USGA. For each of Examples 1 to 6 and Comparative Examples 1 to 6, the resilience was expressed by a differential initial velocity based on an initial velocity in Comparative Example 4. For Example 7, the resilience was expressed by a differential initial velocity based on an initial velocity of Comparative Example 7.

In each of Examples 1 to 6 and Comparative Examples 1 to 6, the solid core was put in a specific mold, and a cover material (Himilan 1601/Himilan 1557=50/50) was injection-molded thereon, to produce a two-piece solid golf ball having a diameter of 42.7 mm and a weight of 45.3 g. In each of Example 7 and Comparative Example 7, the solid core was put in the same specific mold as described above and an intermediate layer material (Himilan 1706/Himilan 1605=50/50) was injection-molded thereon, to produced an intermediate layer covered core having a diameter of about 38.7 mm, and then the intermediate layer covered core was shifted in a specific mold and a cover material (Himilan 1650/Surlyn 8120=50/50) was injection-molded thereon, to produce a three-piece solid golf ball having a diameter of about 42.7 mm and a weight of about 45.3 g.

The carrying performance of each of the golf balls thus obtained was examined. The results are shown in Table 3.

Physical Properties of Golf Ball

Each golf ball was hit at a head speed of 45 m/s by a hitting machine on which a driver (W#1) was previously mounted, and the carry and total distance of the hit ball were measured.

As shown in Table 3, it was found that the golf ball of the present invention can be produced with good workability and exhibit excellent resilience.

TABLE 3

|  | Examples | | | | | | | Comparative Examples | | | | | | |
| --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 |
| Solid Core | | | | | | | | | | | | | | |
| Flexural Amount (mm) (load: 980N) | 3.7 | 3.7 | 3.7 | 3.6 | 3.8 | 3.7 | 3.3 | 3.5 | 3.5 | 3.8 | 3.9 | 3.9 | 3.8 | 3.5 |
| Resilience (m/s) | +0.4 | +0.3 | +0.4 | +0.3 | +0.3 | +0.3 | +0.4 | +0.4 | +0.4 | +0.2 | 0 | −0.1 | +0.1 | 0 |
| Workability in Extrusion | 4 | 4 | 4 | 4 | 5 | 3 | 4 | 1 | 1 | 1 | 5 | 3 | 2 | 5 |
| Physical Properties of Golf Ball (HS45) | | | | | | | | | | | | | | |
| Carry (m) | 211.3 | 210.9 | 211.2 | 210.7 | 211.0 | 211.0 | 211.5 | 210.5 | 210.6 | 209.8 | 208.3 | 208.0 | 209.0 | 208.3 |
| Total (m) | 224.8 | 224.5 | 224.9 | 224.2 | 224.4 | 224.7 | 225.2 | 223.6 | 223.7 | 223.6 | 222.1 | 222.0 | 222.8 | 222.6 |

What is claimed is:

1. A golf ball including, as a composing element, a hot-molded product obtained from a rubber composition, said rubber composition comprising:

a polybutadiene obtained by mixing a polybutadiene (a) with a polybutadiene (b) at a mass ratio [(a)/(b)] ranging from 70/30 to 10/90;

an unsaturated carboxylic acid and/or a metal salt thereof; and an organic peroxide;

wherein said polybutadiene (a) contains 60% or more of cis-1,4-bonds and has a Mooney viscosity [$ML_{1+4}(100°$ C.)] of 10 or more and less than 48, and is synthesized by using a group VIII element catalyst, and said polybutadiene (b) contains 60% or more of cis-1,4-bonds and has a Mooney viscosity [$ML_{1+4}(100°$ C.)] of 50 or more, and is synthesized by using a rare earth element based catalyst, and wherein said golf ball is either a one-piece golf ball or a golf ball including a solid core, and a flexural amount of said one-piece solid golf ball or solid core, measured by applying a load of 980 N (100 kg) thereto, is in a range of 2.0 to 6.0 mm.

2. A golf ball according to claim 1, wherein letting a weight-average molecular weight be Mw ($\times 10^4$), a number-average molecular weight be Mn ($\times 10^4$), and a ratio of the weight-average molecular weight to the number-average molecular weight be Mw/Mn, the ratio Mw/Mn of said component (a) is in a range of 3.0 to 6.0, and the Mw/Mn of said component (b) is in a range of 2.0 to 4.0.

* * * * *